(12) United States Patent
Balasubramanian et al.

(10) Patent No.: US 7,496,694 B2
(45) Date of Patent: Feb. 24, 2009

(54) CIRCUIT, SYSTEMS AND METHODS FOR MONITORING STORAGE CONTROLLER STATUS

(75) Inventors: Sridhar Balasubramanian, Witchita, KS (US); Kenneth A. Hass, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 147 days.

(21) Appl. No.: 11/562,207

(22) Filed: Nov. 21, 2006

(65) Prior Publication Data

US 2008/0120440 A1 May 22, 2008

(51) Int. Cl.
*G06F 3/00* (2006.01)
*G06F 11/00* (2006.01)

(52) U.S. Cl. ............................................. 710/15; 714/5
(58) Field of Classification Search ............. 710/15–19, 710/33–35, 62–64, 72–74; 714/1–5, 39–42, 714/48

See application file for complete search history.

(56) References Cited

U.S. PATENT DOCUMENTS

| | | | |
|---|---|---|---|
| 6,345,368 B1* | 2/2002 | Bergsten | 714/11 |
| 7,003,701 B2* | 2/2006 | Ohwada | 714/43 |
| 7,043,663 B1* | 5/2006 | Pittelkow et al. | 714/4 |
| 7,383,380 B2* | 6/2008 | Yagisawa et al. | 711/114 |
| 2003/0204788 A1* | 10/2003 | Smith | 714/47 |
| 2004/0153777 A1* | 8/2004 | Sugimoto et al. | 714/25 |
| 2005/0005044 A1* | 1/2005 | Liu et al. | 710/74 |
| 2005/0066076 A1* | 3/2005 | Best et al. | 710/33 |
| 2006/0040711 A1* | 2/2006 | Whistler | 455/566 |
| 2006/0143525 A1* | 6/2006 | Kilian | 714/31 |
| 2007/0079062 A1* | 4/2007 | Miyawaki et al. | 711/112 |
| 2007/0168703 A1* | 7/2007 | Elliott et al. | 714/6 |

* cited by examiner

*Primary Examiner*—Christopher B Shin
(74) *Attorney, Agent, or Firm*—Duft, Borsen & Fishman LLP

(57) ABSTRACT

Circuits, systems and methods for improved monitoring of status of a storage controller in a storage system. A monitoring circuit external to the storage controller is adapted to couple to the internal bus structure within the storage controller. The monitoring circuit is adapted to sense status of the storage controller by monitoring bus transactions within the storage controller that indicate status of the control and/or of the storage system. In one aspect the monitoring circuit saves sensed status in a memory associated with the circuit. In another aspect, the monitoring circuit includes a network interface to transmit sensed/saved status to an external data processing system.

21 Claims, 3 Drawing Sheets

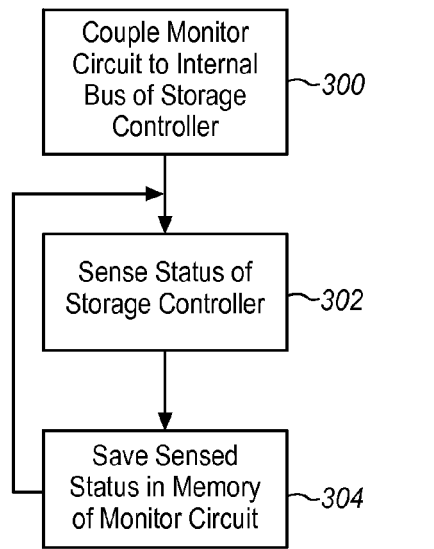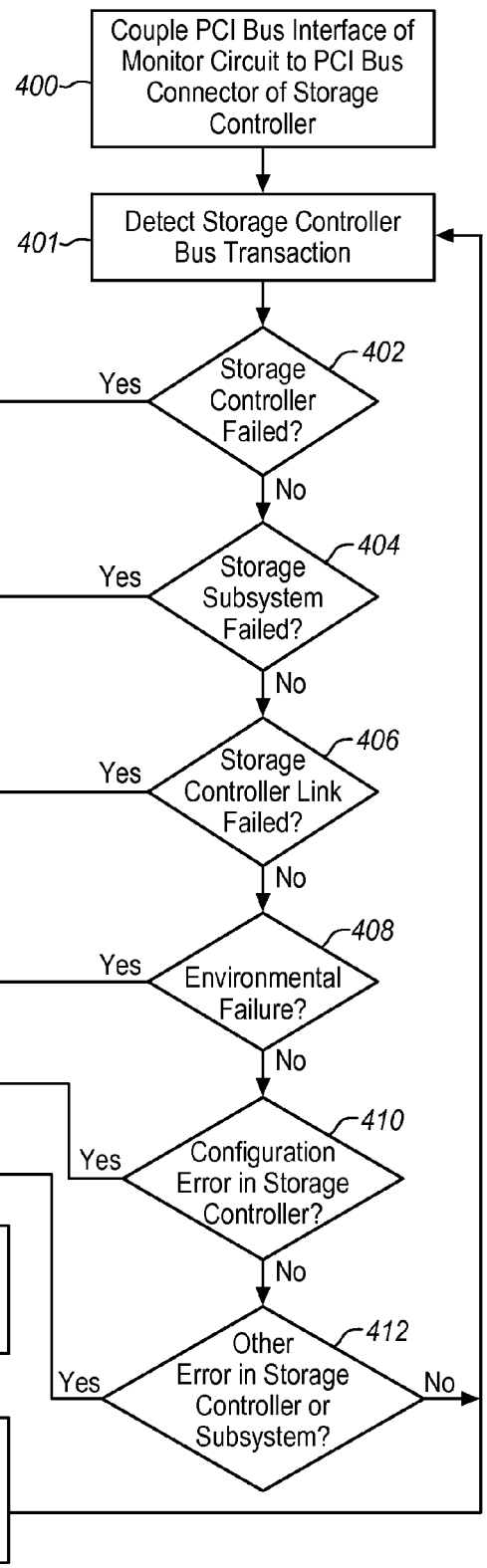

CIRCUIT, SYSTEMS AND METHODS FOR MONITORING STORAGE CONTROLLER STATUS

BACKGROUND

1. Field of the Invention

The invention relates generally to storage systems and more specifically relates to a monitoring circuit adapted for coupling to a storage controller to sense the status of the operating or failed storage controller.

2. Discussion of Related Art

Present-day storage systems generally include significant processing power for reliable storage management and for high performance. Often, a storage subsystem may comprise a large number of storage devices (e.g., disk drives) with a plurality of high performance storage controllers coupled in a paired redundant fashion to the storage devices and coupled to one or more attached host systems. The controller storage controllers may cooperate in a number of ways to distribute processing load among them to improve performance of the storage system and may be adapted to provide redundancy within the storage system to enhance reliability.

It is also a generally known in the industry that the storage controllers within such high performance, high reliability storage subsystems include substantial monitoring features to evaluate the operating status of the storage subsystem as the storage controller initializes (e.g., "boots"). In other words, an aspect of the initialization process of the storage controllers in such advanced storage subsystems evaluates the health of the storage subsystem as the storage controller is booting. Presuming that the storage controller successfully initializes, anomalies detected in the initialization process may be reported to a cooperating, associated diagnostic application operable within an attached host system or server. An operator may then be notified by the diagnostic application of the anomalous condition to permit operator intervention in resolving the problem.

Despite such operational monitoring during the initialization process, such features may be unusable if the error condition is such that the storage controller is incapable of completing its initialization and boot process. Therefore when such fatal or near fatal errors are present in the storage subsystem there may be no effective means for reporting such a status to an associated diagnostic application to permit operator intervention and thus rapid resolution of the problem.

It is therefore evident from the above discussion that an ongoing need exists for improved diagnostic capabilities what to permit sensing and reporting of such fatal and near fatal anomalies in the operation of a storage controller and/or its associated storage subsystem to thus enable appropriate, rapid remedial actions.

SUMMARY

The present invention solves the above and other problems, thereby advancing the state of the useful arts, by providing a monitoring circuit and associated methods of operation to be dynamically integrated with the storage controller and storage subsystem to permit sensing and reporting of such fatal and near fatal anomalies. Thus even if the storage controller of a storage subsystem is incapable of adequately sensing and reporting such conditions, features and aspects hereof permit such monitoring. A monitoring circuit is provided that couples to the internal bus structure of a storage controller and thus provides capability for sensing such anomalous status and for transmitting this sensed status to an external data processing system for appropriate reporting and remedial action. In one aspect, the monitoring circuit includes a storage controller interface adapted to couple to the internal bus structure of a storage controller in a storage subsystem. The controller interface circuit may be coupled to the storage controller with or without power applied to the storage controller. Processing capabilities of the monitoring circuit may then detect internal message exchanges generated by the storage controller as the controller proceeds through its initialization process. Error conditions detected in the monitored status information may be recorded or logged in a memory associated with the monitoring circuit. In another aspect, the monitoring circuit may include a network or other interface for coupling to an external data processing system so that the recorded, logged status information may be communicated to the data processing system for appropriate reporting and remedial action. The network interface may provide a wired network coupling to the external data system or a wireless coupling to the external data system. A variety of particular error conditions or anomalous status information may be gathered by such a monitoring circuit as appropriate for the particular storage controller and storage subsystem architecture and design. In general, operational error conditions, environmental error conditions, and configuration error conditions may be detected by monitoring of messages (i.e., bus transactions) exchanged on the storage controllers internal bus structure.

One feature hereof provides a monitoring circuit adapted for coupling to a storage controller. The monitoring circuit comprises a controller interface adapted to couple the monitoring circuit to the storage controller. The monitoring circuit further comprises a processor coupled to the controller interface and adapted to sense status of the storage controller through the controller interface. The circuit also comprises a memory to store sensed status of the storage controller for further processing by an external data processing system.

Another feature hereof provides a method for monitoring operation of a storage controller. The method comprises coupling a monitor circuit to the storage controller. The method further comprises monitoring operation of the storage controller by operating the monitoring circuit to sense status of the storage controller. The method also comprises saving sensed status in a memory associated with the monitoring circuit.

BRIEF DESCRIPTION OF THE DRAWINGS

FIG. 3 is a flowchart describing a method of operating a system with a monitoring circuit in accordance with features and aspects hereof.

FIG. 4 is a flowchart describing a method of operating a system with a monitoring circuit in accordance with features and aspects hereof.

DETAILED DESCRIPTION OF THE DRAWINGS

Figure 1:
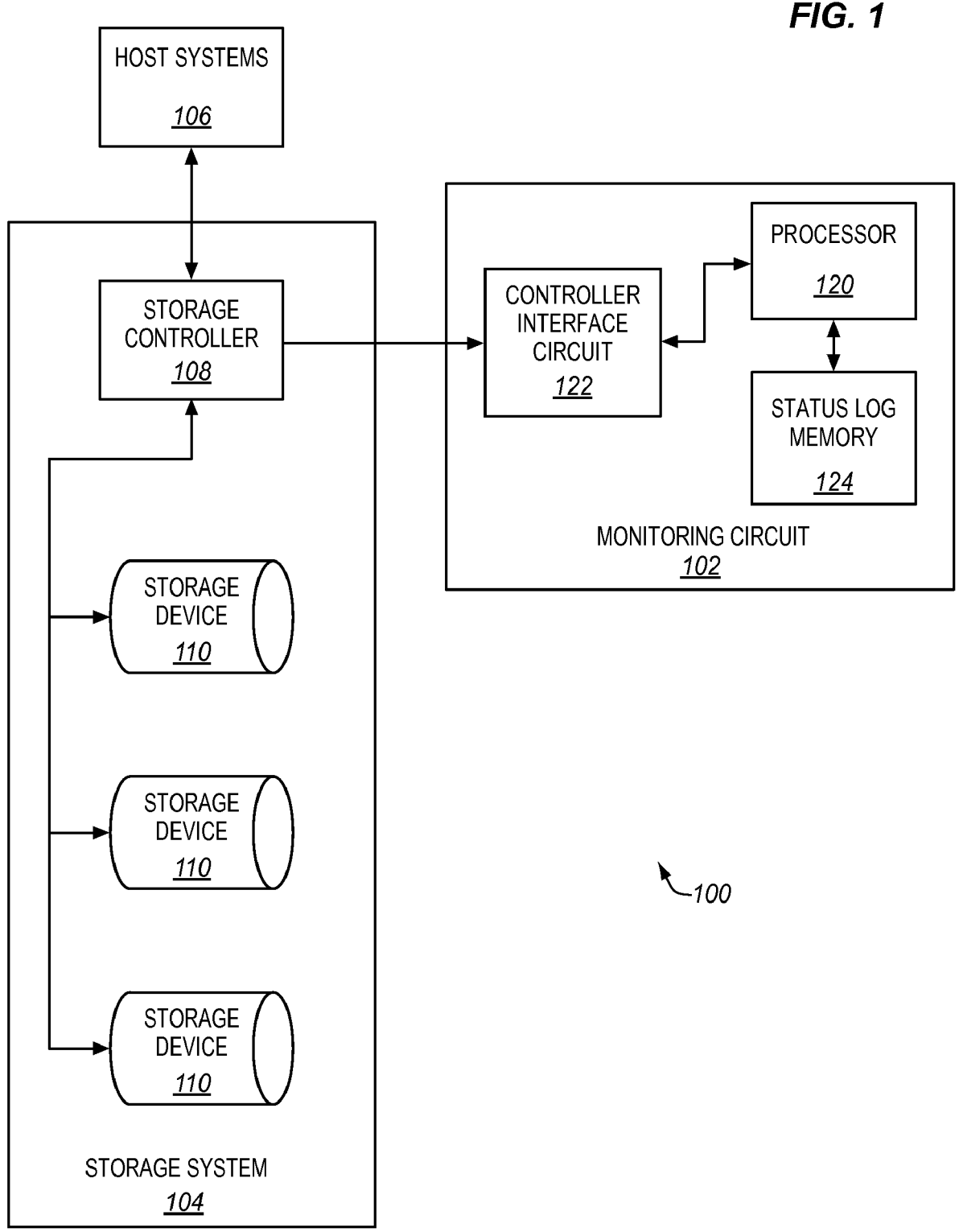
FIG. 1 is a block diagram of an exemplary system including a monitoring circuit to monitor status of a storage controller of the system in accordance with features and aspects hereof.

FIG. 1 is a block diagram of an exemplary system 100 including a monitoring circuit 102 adopted for coupling to the storage controller 108 of a storage system 104. Storage system 104 represents any typical storage subsystem such as a RAID storage subsystem in which one or more storage controllers 108 are utilized to manage storage and retrieval of information on one or more storage devices 110. A plurality of such storage controllers 108 may be provided for additional redundancy and reliability as well as for various forms of performance enhancement. A plurality of storage devices 110 (e.g., disk drives) are provided for enhanced reliability as well as performance under control of the storage management features of storage controllers 108. The one or more storage controllers 108 may also be adapted for coupling to one or more host systems 106 for processing of host I/O requests.

In accordance with features and aspects hereof, system 100 includes monitoring circuit 102 adapted for coupling to one or more storage controllers 108 of the storage system 104. Monitoring circuit 102 is generally operable to monitor status information associated with one or more storage controllers 108 to which the monitoring circuit 102 is coupled.

As noted above, a variety of present-day, commercially available storage systems and storage controllers provide for significant monitoring of present status and operation while the storage system 104 is operable. However, as also noted above, such present monitoring capabilities require that the storage controller, and often the entire storage system 104, succeed in their initial power on or reset initialization processing. In other words, storage controller status monitoring capabilities as presently practiced generally require that the storage controllers 108 of the storage system 104 are capable of initializing beyond a minimal level of power on initialization. Once so initialized, as presently practiced in the art, the storage controller 108 would be capable of communicating with a specialized diagnostic application program operable on an attached host system or server. Such communications with a specialized diagnostic application permits a level of monitoring for status information associated with the ongoing operation of the storage system 104.

By contrast, monitoring circuit 102 of FIG. 1 couples directly to internal bus structures of one or more storage controllers 108 of the storage system 104. Monitoring circuit 102 is then adapted to monitor bus transactions and/or message exchanges on the internal bus structure of one or more storage controllers 108 of storage system 104. Thus, monitoring circuit 102 of FIG. 1 is capable of monitoring status of one or more storage controllers 108 as they proceed through power on initialization. Monitoring circuit 102 therefore is capable of detecting fatal or near fatal errors during the initialization process that would otherwise be undetectable to monitoring structures and techniques as presently practiced.

Monitoring circuit 102 generally includes a controller interface circuit 122 adapted for coupling the monitoring circuit 102 to the internal bus structure of one or more storage controllers 108. Monitoring circuit 102 may further include processor 120 coupled to the controller interface circuit 122 and coupled to status log memory 124. Processor 120 may be adapted to control over all operation of monitoring circuit 102 to receive status information regarding one or more storage controllers 108 via controller interface circuit 122 and to store sensed status information in the status log memory 124 for later processing (e.g., reporting or other analytical processing of the sensed status information). As will be discussed further herein below, the information in status log memory 124 may be communicated to an external data processing system via any of several well-known communication and networking media and protocols. Such an external data processing system may then analyze the various captured status events in received information to determine to identify a particular error or anomalous condition in the power on initialization of one or more storage controllers 108.

Although the system 100 of FIG. 1 provides monitoring capability primarily for purposes of capturing status information pertaining to initialization of storage controllers 108 in a storage system 104, the same structure may be used in an ongoing monitoring process to monitor operation of the one or more storage controllers 108 following power on initialization and during normal operation of the storage system 104. Thus, system 100 of FIG. 1 provides structure and techniques for monitoring status of a storage controller in a storage system both during normal operation as well as during the power on initialization of the system to be monitored.

Those of ordinary skill in the art will readily recognize numerous additional elements useful in a fully functional storage system 104, and/or in a fully functional storage controller 108, and/or in a fully functional monitoring circuit 102. Such additional elements are well known to those of ordinary skill in the art and are eliminated from FIG. 1 simply for brevity of this description.

Figure 2:
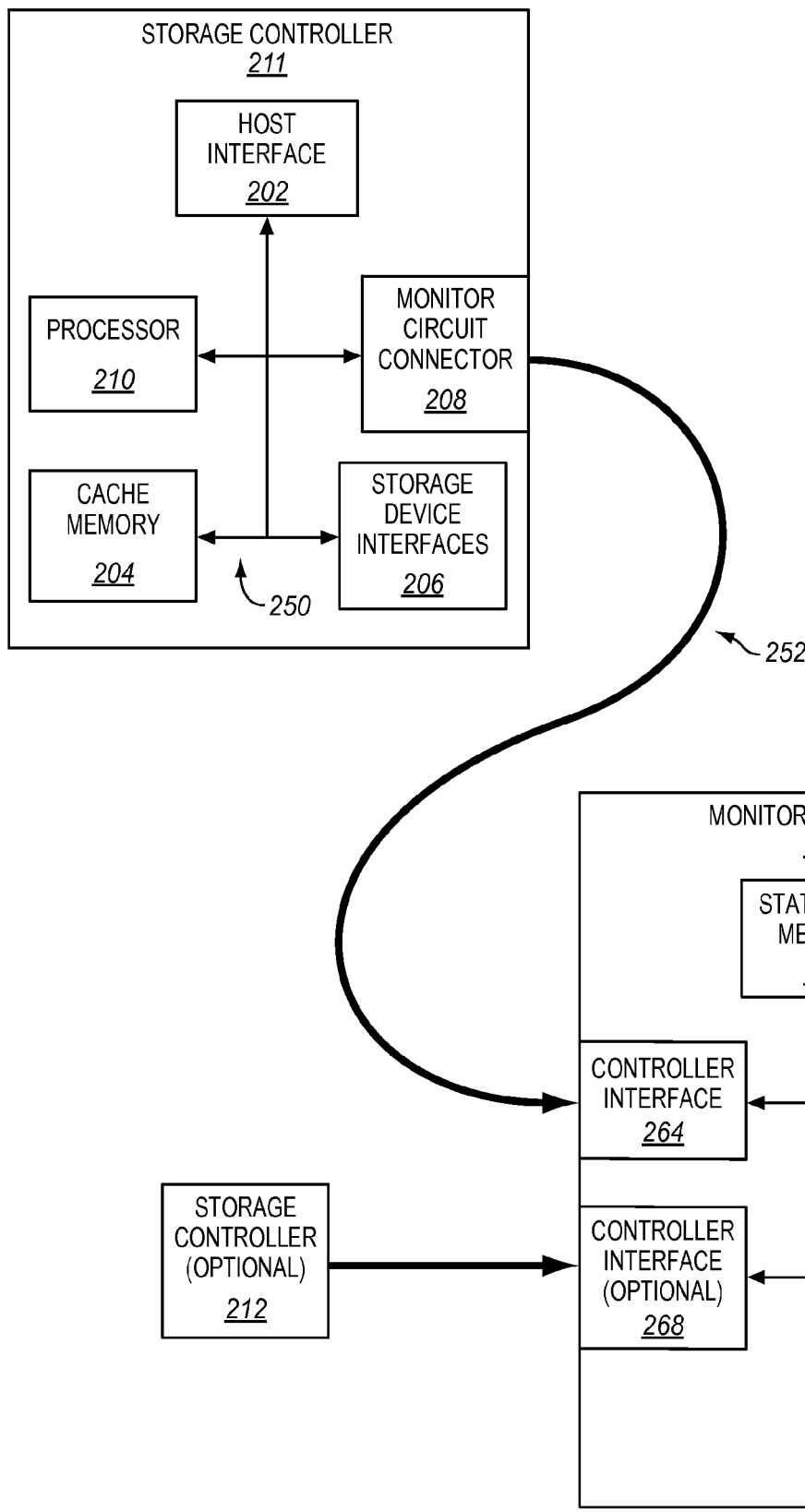
FIG. 2 is a block diagram of an exemplary monitoring circuit coupled to one or more storage controllers in accordance with features and aspects hereof.

FIG. 2 is a block diagram providing additional details of an exemplary storage controller 211 coupled to an exemplary monitoring circuit 200 in accordance with the features and aspects hereof. Exemplary storage controller 211 may include a host interface element 202 adapted for coupling the storage controller 211 to one or more attached host systems and servers. Processor element 210 controls overall operation of the storage controller 211 including, for example, communications with attached host systems and communications with attached storage devices coupled through storage devices interfaces 206. Processor 210 is also generally responsible for performing any desired storage management of the storage devices coupled to the storage controller 211 including, for example, RAID storage management techniques. In accordance with such storage management techniques, processor 210 may utilize cache memory 204 for improving performance of the storage controller 108 in accessing attached storage devices and attached host systems.

Those of ordinary skill in the art will readily recognize a wide variety of well-known, commercially available host interface elements 202 and storage device interface elements 206 appropriate for coupling host systems and storage devices, respectively, to the storage controller 211. Examples of such host interfaces may include serial attached SCSI ("SAS") connectivity, parallel SCSI bus connectivity, Fibre Channel connectivity, Ethernet and other computer networking connectivity, etc. Examples of well-known, commercially available interfaces utilized for coupling storage devices to the storage controller include Fibre Channel, parallel SCSI and SAS, serial advanced technology attachment ("SATA"), etc.

Elements operable within storage controller 211 are typically coupled to one another utilizing well-known commercially available bus structures such as a PCI bus (including many variants and versions thereof), ARM/AHB buses, etc. Monitor circuit connector element 208 therefore represents a suitable connector adapted to permit an external monitoring circuit 200 to couple to the internal bus structure 250 of the storage controller (e.g., as shown by arrow 252). Such an external monitoring circuit 200 may thereby monitor status information sensed as bus transactions exchanged over the internal bus structure 250 of the storage controller 211. Thus, monitoring circuit 200 may monitor status of the storage controller 211 both during its power on initialization sequencing as well as during normal operation following a successful power on initialization.

Monitoring circuit 200 couples to monitor circuit connector 208 of the storage controller 211 as indicated by arrow 252. In particular, a controller interface circuit 264 within monitoring circuit 200 couples the monitoring circuit to the internal bus structure 250 of storage controller 211. Arrow 252 therefore represents any suitable connection including a direct male/female mated coupling as well as appropriate electrical or optical cabling. Further, monitoring circuit 200 includes processor 264 controlling overall operation of monitoring circuit 200 receive status information sensed from internal transactions of bus 250 within storage controller 211 (received through monitoring circuit connector 208, coupling 252, and controller interface element 264). Status log memory 262 within monitoring circuit 200 is used by processor 260 to temporarily store sensed status information received through controller interface 264 from storage controller 211. Elements within monitoring circuit 200 may be coupled by an internal bus structure 270. Internal bus structure 270 may be the same as internal bus 250 of controller 211 or may utilize different bus standards.

Monitoring circuit 200 may include simple user interface features (not shown) such as a simple display panel or even more simplified LED indicators to indicate particular sensed status or progress of initialization or I/O processing within coupled storage controller 211. However, processing capabilities of monitoring circuit 200 preferably are intended to be minimal and thus user interface or analysis processing associated with the sensed status information is intended to be minimal as well. Therefore, monitoring circuit 200 may include an external data processing system interface 266 for coupling monitoring circuit 102 to an external data processing system capable of more thorough analysis and more flexible user interfacing to present the sensed status information. External data processing system interface 266 may be, for example, an appropriate computer network interface such as Ethernet to permit network transmission of stored, sensed status information from the memory 262 to an attached external data processing system.

As thus far described, monitoring circuit 200 may be coupled to a single storage controller 211 to enable sensing of status information from that single storage controller 211. In another aspect hereof, memory circuit monitoring circuit 200 may provide multiple controller interface circuits to allow coupling to multiple storage controllers. For example, monitoring circuit 200 shows an optional second controller interface element 268 adapted for coupling to a second storage controller 212. Such a dual controller coupling capability of monitoring circuit 200 may be useful where the storage system includes dual redundant storage controllers for enhanced reliability and/or for enhanced performance. Those of ordinary skill in the art will readily recognize that monitoring circuit 200 may be further adapted to couple to any number of corresponding storage controllers.

As shown in FIG. 2 and as noted above, in one aspect hereof, the internal bus structure 250 of the storage controller 211 (and optionally 212) may be implemented utilizing, for example, a variety of PCI bus standards including, for example, the PCI-X bus standard. Thus, monitor circuit connector 208 of storage controller 211 (and a similar element in optional controller 212) may represent a suitable connector for coupling a PCI-X bus to the external monitoring circuit 200 to thus extend PCI-X signals over path 252 to an appropriately mated connector in monitoring circuit 200. Thus, monitoring circuit 200 may sense the status of processing in storage controller 211 by sensing PCI-X bus transactions and messages exchanged during initialization as well as normal operation of the storage controller 211.

Those of ordinary skill in the art will readily recognize that processing features in, for example, element 260 of monitoring circuit 200 may be suitably adapted to recognize such PCI-X bus transactions and messages as indicative of particular status events to be sensed within storage controller 211. For example, processor 260 of monitoring circuit 200 may be adapted to recognize particular addresses utilized in PCI-X bus transactions as addresses used within the particular storage controller 211 for exchanging relevant status information within the processing features of storage controller 211— e.g., a specified address or range of addresses may be specified as a trigger address to detect a status event worthy of sensing. When such a trigger address is detected by processor 260, the entire status message or transaction may then be captured and stored in status log memory 262 for later transmission to an external data processing system via interface 266. Thus, as a matter of design choice, processing of processor 260 within monitoring circuit 20 may be suitably adapted to the particular expected exchanges preformed over internal bus structure 250 of storage controller 211 to permit processor 260 to recognize relevant bus transactions that relate to status of the storage controller to be sensed.

Still further, those of ordinary skill will readily recognize that processor 260 and controller interface 264, in combination, may be adapted for this sensing and detection feature. Either or both of elements 260 and 264 may represent customized combinatorial logic circuits and/or suitable programmed instructions to be fetched from a memory and executed by a general or special purpose processor.

Examples of the status information that may be sensed by monitoring circuits 200 via internal bus exchanges on controller 211 may include the following:

storage controller hardware failure;

storage subsystem failure;

storage controller link failure;

disk drive failure;

over temperature;

storage controller firmware not synchronized with peer controller;

storage enclosure failure;

power supply failure;

battery failure;

Fibre Channel failure;

storage controller firmware exception conditions;

logical unit not in preferred path;

cache mirror not synchronized;

peer storage controller failure; and host or disk drive channel communication failure.

Those of ordinary skill in the art will readily recognize that the above list is intended merely as exemplary of some common types of status that may be sensed from bus transactions within the storage controller coupled to the monitoring circuit. The particular status to be sensed for a particular storage controller will be determined as a matter of design choice in accordance with the particular structure and features of the particular storage controller. Such design choices will be readily apparent to those of ordinary skill in the art.

Those of ordinary skill in the art will readily recognize numerous additional elements useful in a fully functional storage controller 211/212 and/or in a fully functional monitoring circuit 200. Such additional elements are well known to those of ordinary skill in the art and are eliminated from FIG. 2 simply for brevity of this description.

FIG. 3 is a flowchart broadly describing a method in accordance with features and aspects hereof for utilizing a monitoring circuit adapted for coupling to a storage controller to sense status of the storage controller both during normal operation and during power on initialization of the storage controller. Element 300 represents suitable processing to physically couple a monitoring circuit to the internal bus structure of the storage controller to be monitored. Such a coupling may utilize any of several commercially available connector structures as well as electrical or optical cabling and transmission structures to couple the monitoring circuit to the internal bus structure of the storage controller to be monitored. The particular form of coupling is a matter of design choice appropriate for the particular storage controller architecture and the chosen structure of the monitoring circuit.

Once so physically coupled, the monitoring circuit is then operable at element 302 to sense status of the storage controller by recognizing the internal bus transactions within the storage controller that represent relevant status information useful for later post processing analysis. As noted above, processing features within the monitoring circuit may be programmed to recognize particular address ranges as representative of relevant status information and/or to recognize particular bit patterns or data sequences as relevant status information to be saved and recorded. Element 304 then represents suitable processing within the monitoring circuit to save the sensed status information in an associated memory of the monitoring circuit. As noted above, the monitoring circuit is intended to provide simple, cost effective monitoring circuitry. Thus, simple non-volatile memory devices may be used to log sensed status. For example, flash memory or other low cost, non-volatile, re-writable memory may be used. Or, for example, as noted above, the monitoring circuit may include a network interface to allow either wired or wireless connectivity between the monitoring circuit and an external data processing system. Thus the saved sensed status information may be only temporarily stored in a nonvolatile or volatile memory component within the monitoring circuit only long enough to permit eventual transmission of the logged status information through the network interface to an external data processing system.

The method of FIG. 3 then continues essentially infinitely looping to sense additional status information and save any sensed status information in the associated memory of the monitoring circuit. Eventually, the information stored in the associated memory of the monitoring circuit may be forwarded to another system for data reduction and analysis to determine what if any particular failure or error status has occurred on the monitored storage controller.

FIG. 4 is a flowchart providing an exemplary method in accordance with features and aspects hereof to monitor operation of a storage controller in order to detect relevant status information either during normal operation of the storage controller or during power on initialization of the storage controller. Element 400 represents suitable processing to physically couple the monitoring circuit to the storage controller to be monitored. In one exemplary embodiment, both the storage controller and the monitoring circuit utilize a PCI bus structure such as a PCI-X bus structure for their respective internal communications. Thus, element 400 may represent processing to physically couple the PCI-X internal bus structure of the monitoring circuit to the PCI-X internal bus structure of the storage controller to be monitored.

Once so coupled, elements 401 through 422 are iteratively operable to sense and save any of a variety of particular types of status changes relevant to operation of the storage controller. The sensed and saved status may be used for post processing analysis of the operational state of the monitored storage controller. In particular, element 401 is operable to detect a next state of the monitored controller. As noted above, combinatorial logic in conjunction with programmed instructions on a processor may be employed to sense a particular range or types of bus transactions. Next, elements 402 through 412 are each operable to determine whether a current sensed status of the storage controller (sensed by element 401) represents a status to be saved for subsequent post processing analysis. As noted above, the processing of elements 402 through 412 may represent processing to detect whether particular address ranges are involved in a particular PCI bus transaction or whether a particular sequence of data has been detected through one or more PCI bus transactions within the storage controller to be monitored.

For example, element 402 may determine whether the current sensed status represents a known failure mode of the storage controller. In like manner, element 404 may determine whether the presently sensed status represents a common failure mode of the entire storage subsystem. Further, element 406 determines whether a present sensed transaction represents a common failure mode for a storage controller linkage to storage devices or to attached host systems. Still further, element 408 represents processing to determine whether currently sensed bus transactions of the storage controller indicate some environmental failure such as power or cooling, element 410 determines whether presently sensed bus transactions represent a configuration error of the storage controller, and element 412 represents any other processing for sensing whether presently sensed a bus transactions represent any other known error or configuration problem within the monitored storage controller.

If none of the known status conditions are sensed, processing continues looping back to element 401 awaiting the next sensed bus transaction to detention whether a next transaction may represent relevant status information. If instead any of elements 402 through 412 detect an error or configuration problem from presently sensed bus transactions of the storage controller, element 420 is then operable to log the sensed status information in a memory associated with the monitoring circuit. Element 422 is then operable periodically to transmit logged status information to an external data processing system utilizing, for example, a network connection to the external data processing system. Processing then continues looping back to element 401 to await a next detected bus transaction and to then determine by operation of elements 402 through 412 whether the next sensed bust transaction represents relevant status information to be logged and eventually transmitted to the external data processing system.

Those of ordinary skill in the art will readily recognize a variety of equivalent and/or additional steps to those described in the methods of FIGS. 3 and 4. Such additional processing steps are well known to those of ordinary skill and the art and omitted herein for simplicity and brevity of discussion. Further, the methods described in FIGS. 3 and 4 may be implemented as suitably programmed instructions in a general or special purpose processor device or, in a preferred embodiment, may be programmed as custom combinatorial logic in a full custom integrated circuit, a gate array circuit, a field programmable gate array circuit, etc. Still further, the methods of FIGS. 3 and 4 may be implemented as any combination of custom designed combinatorial logic circuits and suitable programmed instructions operable in a general or special purpose processor.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A monitoring circuit adapted for coupling to a storage controller, the monitoring circuit comprising:
   a controller interface adapted to couple the monitoring circuit to the storage controller, the controller interface comprising a bus interface circuit adapted to couple the monitoring circuit with a bus, the bus being used for internal communications within the storage controller;

a processor coupled to the controller interface and adapted to sense status of the storage controller through the controller interface; and a memory to store sensed status of the storage controller for further processing by an external data processing system;

wherein the monitoring circuit is devoid of a storage device interface.

2. The circuit of claim 1 further comprising:
a network interface adapted for transmitting the sensed status from the memory to the external data processing system.

3. The circuit of claim 2
wherein the network interface further comprises:
a wireless transceiver for wireless transmission to the external data processing system.

4. The circuit of claim 1, wherein the bus is a PCI bus.

5. The circuit of claim 1
wherein the processor is adapted to sense status of the storage controller wherein the status includes error conditions and/or configuration errors.

6. The circuit of claim 1
wherein the sensed status includes one or more of:
storage controller hardware failure;
storage subsystem failure;
storage controller link failure;
disk drive failure;
over temperature;
storage controller firmware not synchronized with peer controller;
storage enclosure failure;
power supply failure;
battery failure;
Fibre Channel failure;
storage controller firmware exception conditions;
logical unit not in preferred path;
cache mirror not synchronized;
peer storage controller failure; and
host or disk drive channel communication failure.

7. The circuit of claim 1
wherein the storage controller interface further comprises:
a dual storage controller interface wherein the monitoring circuit may be coupled to dual storage controllers of a storage subsystem to monitor status of two storage controllers.

8. A method for monitoring operation of a storage controller, the method comprising:
coupling a monitor circuit to the storage controller, further comprising coupling a bus interface component of the monitor circuit to a bus of the storage controller, the bus being used for internal communications within the storage controller;
monitoring operation of the storage controller by operating the monitoring circuit to sense status of the storage controller; and
saving sensed status in a memory associated with the monitoring circuit;
wherein the monitor circuit is devoid of a storage device interface.

9. The method of claim 8, wherein the bus is a PCI bus.

10. The method of claim 8 further comprising:
transmitting the saved sensed status from the memory of the monitor circuit to an external data processing system.

11. The method of claim 10
wherein the step of transmitting further comprises:
transmitting the sensed status to the external data processing system using a wired network connection.

12. The method of claim 10
wherein the step of transmitting further comprises:
transmitting the sensed status to the external data processing system using a wireless network connection.

13. The method of claim 8
wherein the step of monitoring further comprises:
monitoring the storage controller to sense status of the storage controller wherein the status includes error conditions and/or configuration errors.

14. The method of claim 8
wherein the step of monitoring further comprises:
monitoring the storage controller to sense status of the storage controller wherein the status one or more of:
storage controller hardware failure;
storage subsystem failure;
storage controller link failure;
disk drive failure;
over temperature;
storage controller firmware not synchronized with peer controller;
storage enclosure failure;
power supply failure;
battery failure;
Fibre Channel failure;
storage controller firmware exception conditions;
logical unit not in preferred path;
cache mirror not synchronized;
peer storage controller failure; and
host or disk drive channel communication failure.

15. The method of claim 8
wherein the monitoring circuit is adapted to couple to multiple storage controllers, and
wherein the step of monitoring further comprises:
monitoring operation of multiple storage controllers by operating the monitoring circuit to sense status of the multiple storage controllers.

16. A system comprising:
a plurality of storage devices;
a storage controller coupled to the plurality of storage devices and adapted for coupling to one or more host systems; and
a monitoring circuit adapted for coupling to the storage controller, the monitoring circuit comprising:
a controller interface adapted to couple the monitoring circuit to the storage controller, the controller interface comprising a bus interface circuit adapted to couple the monitoring circuit with a bus, the bus being used for internal communications within the storage controller;
a processor coupled to the controller interface and adapted to sense status of the storage controller through the controller interface; and
a memory to store sensed status of the storage controller for further processing by an external data processing system;
wherein the monitoring circuit is devoid of a storage device interface.

17. The system of claim 16 wherein the monitoring circuit further comprises:
a network interface adapted for transmitting the sensed status from the memory to the external data processing system.

18. The system of claim 17 wherein the network interface of the monitoring circuit further comprises:
a wireless transceiver for wireless transmission to the external data processing system.

19. The system of claim 16, wherein the bus is a PCI bus.

20. The system of claim 16 wherein the processor of the monitoring circuit is adapted to sense status of the storage controller wherein the status includes error conditions and/or configuration errors.

21. The system of claim 16 wherein the sensed status includes one or more of:
storage controller hardware failure;
storage subsystem failure;
storage controller link failure;
disk drive failure;
over temperature;
storage controller firmware not synchronized with peer controller;
storage enclosure failure;
power supply failure;
battery failure;
Fibre Channel failure;
storage controller firmware exception conditions;
logical unit not in preferred path;
cache mirror not synchronized;
peer storage controller failure; and
host or disk drive channel communication failure.

* * * * *